United States Patent [19]

Kelbel

[11] 4,154,126

[45] May 15, 1979

[54] COMPACT GEAR ASSEMBLY

[75] Inventor: Donald W. Kelbel, Muncie, Ind.

[73] Assignee: Borg-Warner Corporation, Chicago, Ill.

[21] Appl. No.: 736,906

[22] Filed: Oct. 29, 1976

[51] Int. Cl.² ............... F16H 37/06; F16H 3/04
[52] U.S. Cl. ..................... 74/665 GA; 74/665 K; 74/332
[58] Field of Search ............ 74/804, 805, 674, 750 R, 74/665 R, 665 F, 665 GA, 665 GD, 665 GE, 332, 438, 665 K, 665 P

[56] References Cited

U.S. PATENT DOCUMENTS

| | | | |
|---|---|---|---|
| 1,232,717 | 7/1917 | Rathman | 74/805 |
| 1,392,508 | 10/1921 | Krohn | 74/805 |
| 2,592,910 | 4/1952 | Keller | 74/750 R X |
| 2,667,089 | 1/1954 | Gregory | 74/804 X |
| 4,005,619 | 2/1977 | Schmermund | 74/804 |
| 4,040,309 | 8/1977 | Wood et al. | 74/665 GE X |

Primary Examiner—Samuel Scott
Assistant Examiner—Lance W. Chandler
Attorney, Agent, or Firm—Julian Schachner

[57] ABSTRACT

A gear assembly having both compactness and a short installation length includes a mainshaft sun gear and a ring gear rotatable on a first axis, and an internal subassembly having intermediate ring and sun gears mounted in an eccentric bearing block for rotation on a second axis offset from the first axis. The assembly may be mounted entirely within a drive sprocket.

13 Claims, 3 Drawing Figures

U.S. Patent  May 15, 1979  4,154,126
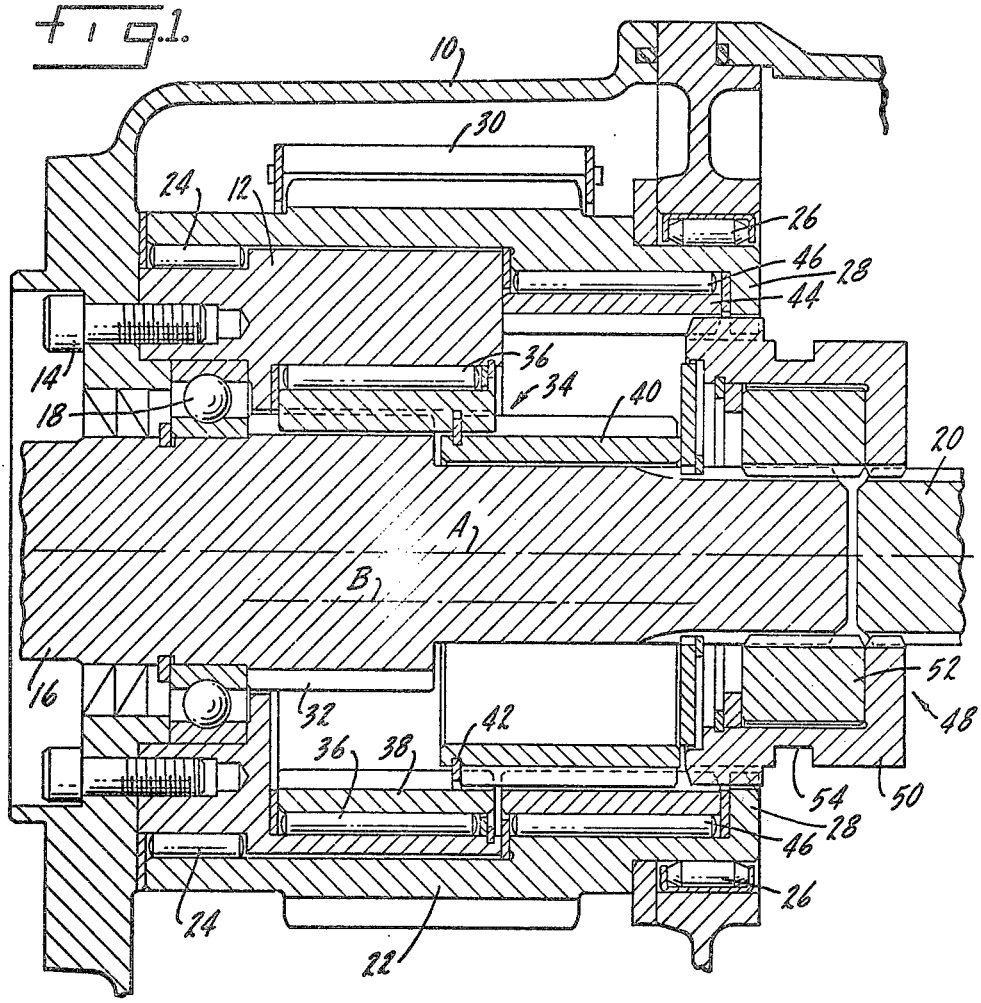
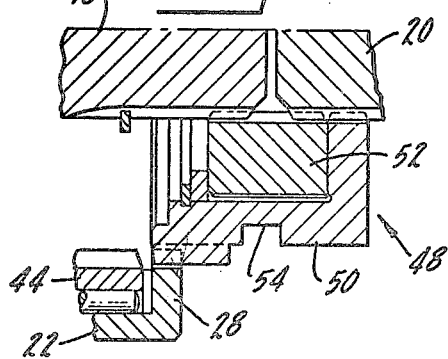
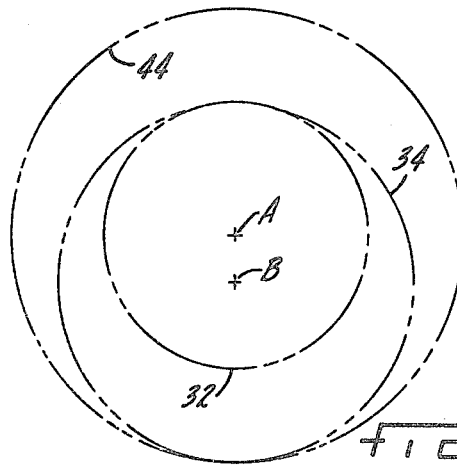

though this invention is susceptible of embodiment in many different forms, there is shown in the drawing and will be described herein in detail a preferred embodiment. It should be understood that the present disclosure is considered to be an exemplification of the principles of the invention, and is not intended to limit the invention to this embodiment.

COMPACT GEAR ASSEMBLY

BACKGROUND OF THE INVENTION

This invention relates generally to a power transfer mechanism. More particularly it relates to a compact gear assembly having a sub-assembly rotatable about an internal axis, thereby resulting in compactness of the entire assembly.

In recent years there have been many improvements in power transfer mechanisms, including improvements relating to the size of gear assemblies. Some such power transfer mechanisms include variations of spur gear sets and multiple countershafts. Others are directed to planetary arrangements. Generally, these efforts have resulted in complicated systems which require considerable space. There remains a need to provide a gear assembly which is simple, is light, and does not require excessive space when incorporated in a power transfer mechanism. This becomes increasingly important when considered in view of the increasing interest in reducing the size and weight of automotive vehicles.

SUMMARY OF THE INVENTION

This invention is directed in brief to an improved gear assembly capable of overcoming the deficiencies noted above. The gear assembly includes an input sun gear and an output ring gear mounted for rotation about a common axis. Intermediate ring and sun gears together form an internal sub-assembly rotatable about another axis offset therefrom. A shifting sleeve engages the output ring gear with one or more suitable output elements. Provision is made for mounting the entire gear assembly within a drive sprocket, and for the provision of an additional output shaft. In reduction, the sleeve engages the output ring gear with the sprocket and/or output shaft. In direct, the sleeve locks the input shaft with the sprocket and/or output shaft.

One application contemplated for the improved gear assembly is in an automotive vehicle having a transfer case for use between a prime mover and a pair of drive axles. Such a transfer case could be adaptable for transferring torque from the prime mover to one axle directly and to the other axle through an overrunning clutch or the like.

BRIEF DESCRIPTION OF THE DRAWING

The objects and advantages of this invention will become apparent to those skilled in the art upon careful consideration of the specification herein, including the drawing, wherein:

FIG. 1 is a sectional view showing details of the improved gear assembly in the low range mode establishing reduction ratio drive;

FIG. 2 is a partial sectional view showing details of the gear assembly in the high range mode establishing direct drive; and FIG. 3 is a diagram showing the orientation of the gears included in the gear assembly.

While this invention is susceptible of embodiment in many different forms, there is shown in the drawing and will be described herein in detail a preferred embodiment. It should be understood that the present disclosure is considered to be an exemplification of the principles of the invention, and is not intended to limit the invention to this embodiment.

DESCRIPTION OF THE PREFERRED EMBODIMENT

Referring now to the drawing in greater detail, there is shown generally a housing 10 which may be the housing of a transfer case for use in an associated automotive vehicle. An eccentric bearing block 12 is fixedly secured to housing 10 by bolts 14 or other suitable means. Thus, in effect, bearing block 12 forms part of housing 10.

An input shaft 16 extends into housing 10 and is journalled in a suitable bearing 18 for rotation about a first axis A. It should be understood that shaft 16 may be the output shaft of a manual or automatic transmission incorporated in an associated automotive vehicle. An output shaft 20 is conventionally journalled in housing 10 for rotation about axis A. Shaft 20 extends from one housing 10, and in preferred form of the invention may be connected with the normal drive axle of an associated automotive vehicle. A drive sprocket 22 is journalled in housing 10 by a pair of suitable bearings 24 and 26 for rotation about axis A. Sprocket 22 defines an inwardly extending flange 28. In one preferred form of the invention, a suitable chain 30 may couple sprocket 22 with the other axle of an associated automotive vehicle. This may be done through an overrunning device or the like if desired.

The gear assembly includes an input sun gear 32 defined by shaft 16. Sun gear 32 is rotatable about axis A of shaft 16, shaft 20 and sprocket 22.

The gear assembly also includes an internal sub-assembly 34 journalled in a suitable bearing 36 for rotation about a second, internal axis B parallel to and offset from axis A. Sub-assembly 34 includes a ring gear 38 and a sun gear 40 in mesh with ring gear 38. This meshing relationship in effect constitutes a spline connection, and thus gears 38 and 40 are secured together for unitary rotation. Gears 38 and 40 also are secured together for unitary axial movement by a suitable locking ring 42. It should be understood that sub-assembly 34 is a two piece mechanism for economy of manufacture. However, it may be formed as a single mechanism if desired. Gear 38 is in mesh with gear 32.

The gear assembly further includes an output ring gear 44 journalled in a suitable bearing 46 for rotation about axis A. Gear 44 is in mesh with gear 40.

Thus it will be seen that gears 32 and 44 are co-axial and rotate about axis A, and that gears 38 and 40 are coaxial and rotate about axis B. Axis B is parallel to and offset from axis A. In one preferred form of the invention, axis B lies within all of the gears.

A shifting mechanism 48 includes a sleeve 50 rotatably supporting a collar 52. Sleeve 50 is splined to flange 28 of sprocket 22 and to shaft 20 for rotation therewith, but is free for axial sliding movement relative thereto. Collar 52 is splined to shaft 16 for rotation therewith, but is slidable with sleeve 50. Mechanism 48 is slidable between the leftward, low range position shown in FIG. 1 and the rightward, high range position shown in FIG 2.

In the low range position, mechanism 48 establishes reduction ratio drive by engaging gear 44 through sleeve 50 with flange 28 of sprocket 22 and with shaft 20. In this position collar 52 is not engaged with shaft 20. In the high range position, mechanism 48 establishes direct drive by engaging shaft 16 through collar 52 with shaft 20 and through sleeve 50 with flange 28 of sprocket 22. In this position sleeve 50 is not engaged with gear 44. A suitable shift fork, not shown, engages a groove 54 of sleeve 50 in order to effect sliding of mechanism 48.

In reduction, power is transferred from shaft 16 and sun gear 32 to intermdiate ring gear 38. As gears 38 and 40 rotate together, power is transferred from intermediate sun gear 40 to output ring gear 44, and through mechanism 48 to sprocket 22 and shaft 20. In direct, power is transferred from shaft 16 through mechanism 48 to sprocket 22 and output shaft 20.

Thus it will be seen that a compact gear assembly is provided which has a short overall length. An internal sub-assembly incorporates an intermediate ring gear which receives power from an input sun gear, and an intermediate sun gear which drives an output ring gear. The input sun and output ring gears are concentric, and the sub-assembly is eccentric thereto. The gear assembly is such that it may be incorporated entirely within the drive sprocket.

An inherent advantage of this gear assembly is that the input and outputs are directly connected in the high range mode. Thus, in direct drive the gears are not loaded.

While a preferred embodiment of the invention has been shown and described, this should be considered as illustrative and may be modified by those skilled in the art. It is intended that the claims herein cover all such modifications as may fall within the spirit and scope of the invention.

What is claimed is:

1. A gear assembly comprising a housing, a sun gear and a ring gear rotatable in said housing about a first axis, an eccentric bearing block fixedly secured to said housing, and a sub-assembly rotatable in said bearing block about a second axis offset from said first axis, said sub-assembly including another ring gear meshing with said sun gear, and another sun gear meshing with said ring gear, said other ring and sun gears being locked for rotation together.

2. The invention of claim 1, said first and second axes being parallel.

3. The invention of claim 1, said other ring gear meshing with said other sun gear, whereby they are locked for rotation together.

4. The invention of claim 1, said other ring and sun gears being locked together to prevent relative axial movement therebetween.

5. A gear assembly comprising an input shaft supported for rotation about a first axis, output means supported for rotation about said first axis, an input external sun gear rotatable about said first axis in response to rotation of said input shaft, an intermediate internal ring gear rotatable about a second axis in response to rotation of said input sun gear, an intermediate external sun gear rotatable about said second axis in response to rotation of said intermediate ring gear, an output internal ring gear rotatable about said first axis in response to rotation of said intermediate sun gear, said output means being rotatable in response to rotation of said output ring gear, and shift means movable to a first position engaging said output ring gear with said output means and to a second position engaging said input shaft with said output means.

6. The invention of claim 5, said first and second axes being parallel.

7. The invention of claim 5, said first and second axes being parallel and within all of said gears.

8. The invention of claim 5, said intermediate gears being secured together for rotation as a unit.

9. The invention of claim 5, said input sun and intermediate ring gears being in mesh, said intermediate gears being in mesh, and said intermediate sun and output ring gears being in mesh.

10. The invention of claim 9, said input shaft defining said input sun gear.

11. The invention of claim 5, said output means including a sprocket, and said gears being journalled within said sprocket.

12. The invention of claim 5, said output means including an output shaft and a sprocket, and said shift means including a sleeve engaged with said output shaft and said sprocket, and a collar rotatably supported by said sleeve and engaged with said input shaft, said sleeve being engageable with said output ring gear in said first position, and said collar being engageable with said output shaft in said second position.

13. The invention of claim 12, said gears being journalled within said sprocket.

* * * * *